(12) United States Patent
Leung et al.

(10) Patent No.: US 6,988,822 B2
(45) Date of Patent: Jan. 24, 2006

(54) ELECTRIC HAND MIXER

(75) Inventors: Chi Wah Leung, Hong Kong (HK);
Chi Chung Fung, Hong Kong (HK);
Shek Chuen Luk, Hong Kong (HK)

(73) Assignee: Simatelex Manufactory Co. Ltd.,
Chaiwan (HK)

( * ) Notice: Subject to any disclaimer, the term of this patent is extended or adjusted under 35 U.S.C. 154(b) by 168 days.

(21) Appl. No.: 10/391,945

(22) Filed: Mar. 19, 2003

(65) Prior Publication Data

US 2004/0184347 A1 Sep. 23, 2004

(51) Int. Cl.
*A47J 43/044* (2006.01)

(52) U.S. Cl. .................. 366/129; 366/288; 366/300

(58) Field of Classification Search ............ 366/129, 366/287, 288, 297, 300, 301
See application file for complete search history.

(56) References Cited

U.S. PATENT DOCUMENTS

| 1,762,081 | A | * | 6/1930 | Schleicher | 366/288 |
| 2,047,841 | A | * | 7/1936 | Van Guilder | 366/288 |
| 3,656,718 | A | * | 4/1972 | Cairelli | 366/200 |
| 4,337,000 | A | * | 6/1982 | Lehmann | 366/288 |
| 2001/0040838 | A1 | * | 11/2001 | Buchsteiner et al. | 366/244 |

* cited by examiner

*Primary Examiner*—David Sorkin

(74) *Attorney, Agent, or Firm*—Jackson Walker, LLP

(57) ABSTRACT

An electric hand mixer comprises a housing and a motor mounted with the housing. A gearbox is mounted with the housing and coupled with an output shaft of the motor. A pair of spindles having respective axes are positioned about a shared axis. The spindles are coupled with the gearbox for rotation about the respective axes and rotation about said third axis.

4 Claims, 18 Drawing Sheets

ELECTRIC HAND MIXER

BACKGROUND OF THE INVENTION

1. Field of the Invention

The invention relates to electric hand mixers.

2. Background Information

Know in electric hand mixers comprise an enclosure provided with an electrical high-speed motor connected to a step-down gearbox. The step-down gearbox has two parallel output spindles. Beaters are plugged into the spindles and aligned in parallel. When the hand mixer is turned on, the two beaters turn in opposite directions to each other. Rotation of the beater draws the mixture into the gap between two beaters from one side and push out from the other side. The mixture flows mainly in a single direction. In addition, the beater mixing plane is not in circular shape and not able to reach every part of the mixing container. Hence, the hand mixer must be moved around the container in order to evenly mix the mixture.

SUMMARY OF THE INVENTION

It is an object of the present invention is to overcome or ameliorate the above-mentioned problems, or at least to provide the public with a useful alternative.

According to the invention there is provided an electric hand mixer comprising:

- a housing,
- a motor mounted with the housing and having an output shaft,
- a gearbox mounted with the housing and coupled with the output shaft,
- a pair of spindles having respective axes and positioned about a shared axis, the spindles coupled with the gearbox for rotation about the respective axes and rotation about said shared axis.

Preferably, the gearbox comprises a first reduction portion and a second position coupled to the spindles for rotation about the respective axes and rotation about said shared axis.

Preferably, the gearbox comprises a first reduction portion and a second position coupled to the spindles for rotation about the respective axles and rotation about said shared axis.

Preferably, the gearbox comprises a planetary carrier positioned concentric with the shared axis and having the spindles movably mounted to the planetary carrier, a driving gear coupled with the output shaft and one of the spindles, a ring gear coupled with the driving gear and other one of the spindles, and wherein the ring gear is fixed for rotation of the planetary carrier about the shared axis.

Preferably, the beater further including means for selectively permitting rotation of the spindles about the respective axes and not about said shared axis.

Preferably, the gearbox comprises a planetary carrier positioned concentric with the shared axis and having the spindles movably mounted to the planetary carrier, a driving gear coupled with the output shaft and one of the spindles, a ring gear coupled with the driving gear and other one of the spindles, and a stopper movable between a first and a second position for engaging and stopping rotation of either the planetary carrier or ring gear.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EXAMPLES

Figure 1:
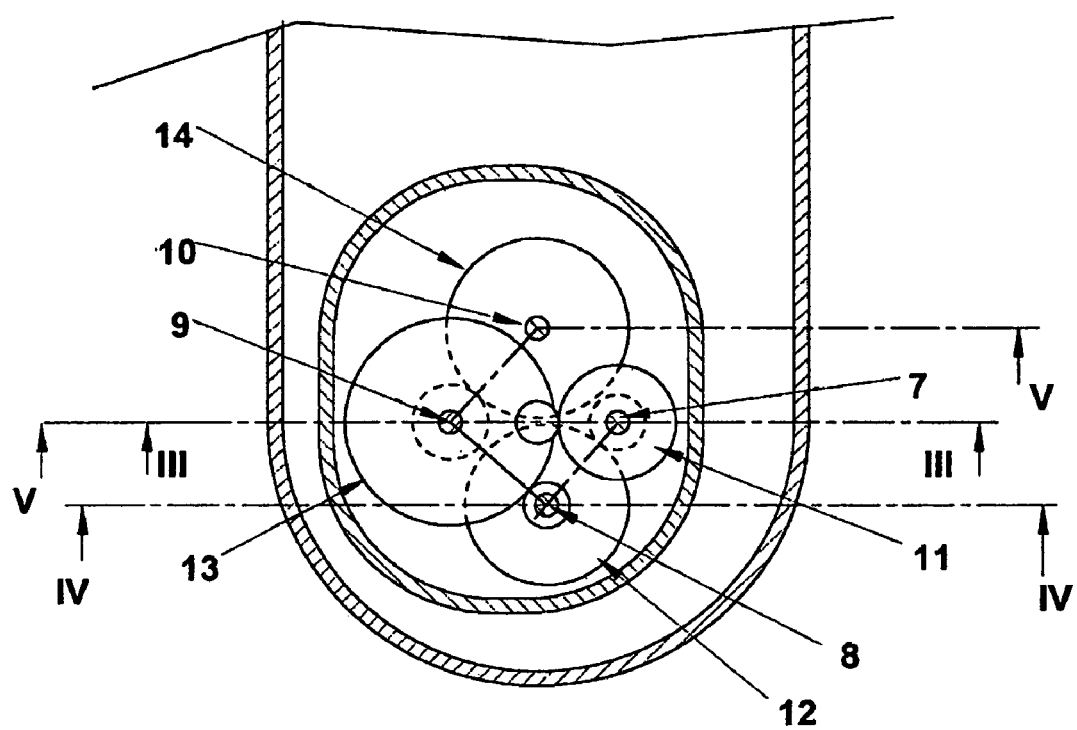
FIG. 1 is a plan view of a speed reduction gearbox.
Figure 2:
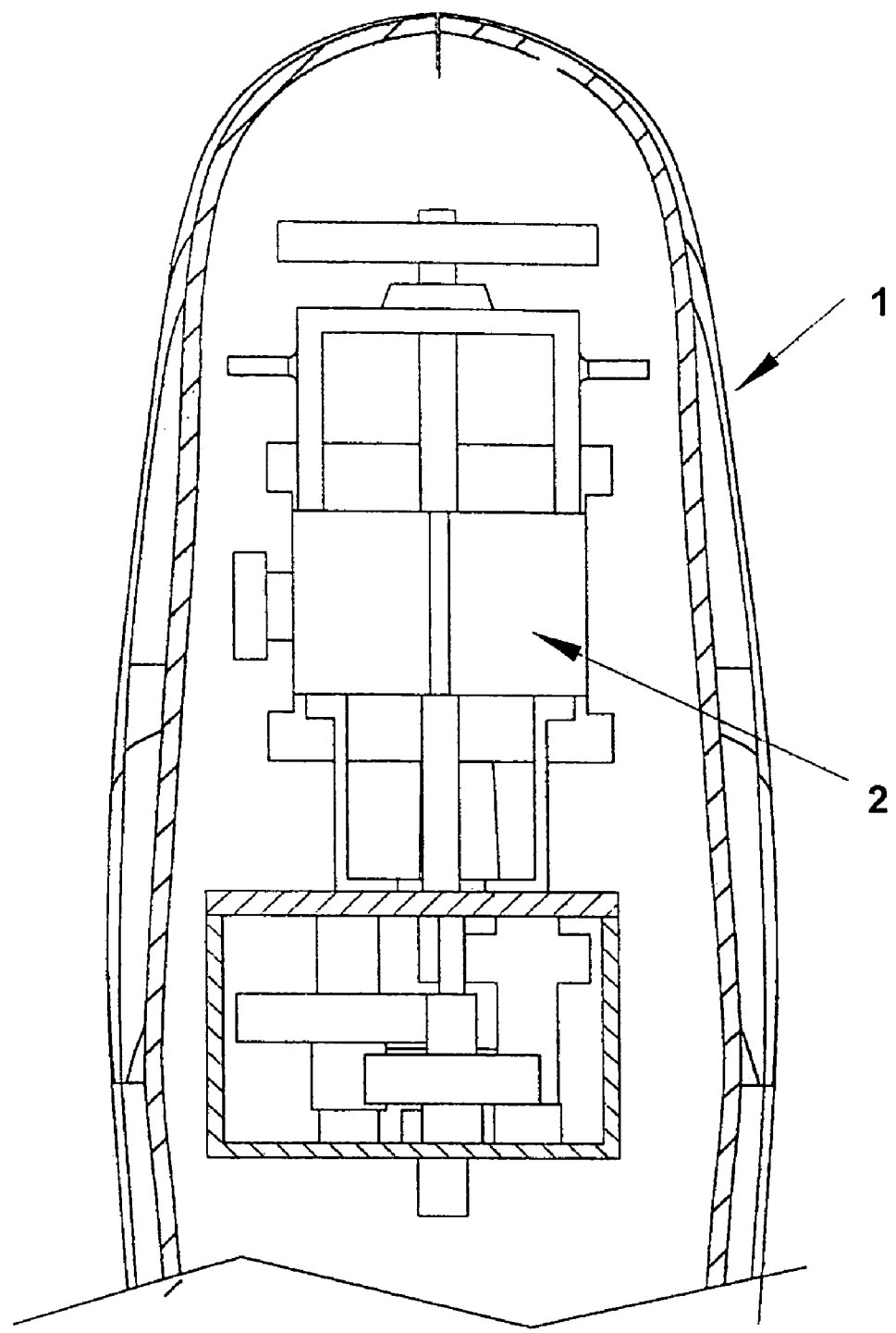
FIG. 2 is an elevation view of a speed reduction gearbox.
Figure 3:
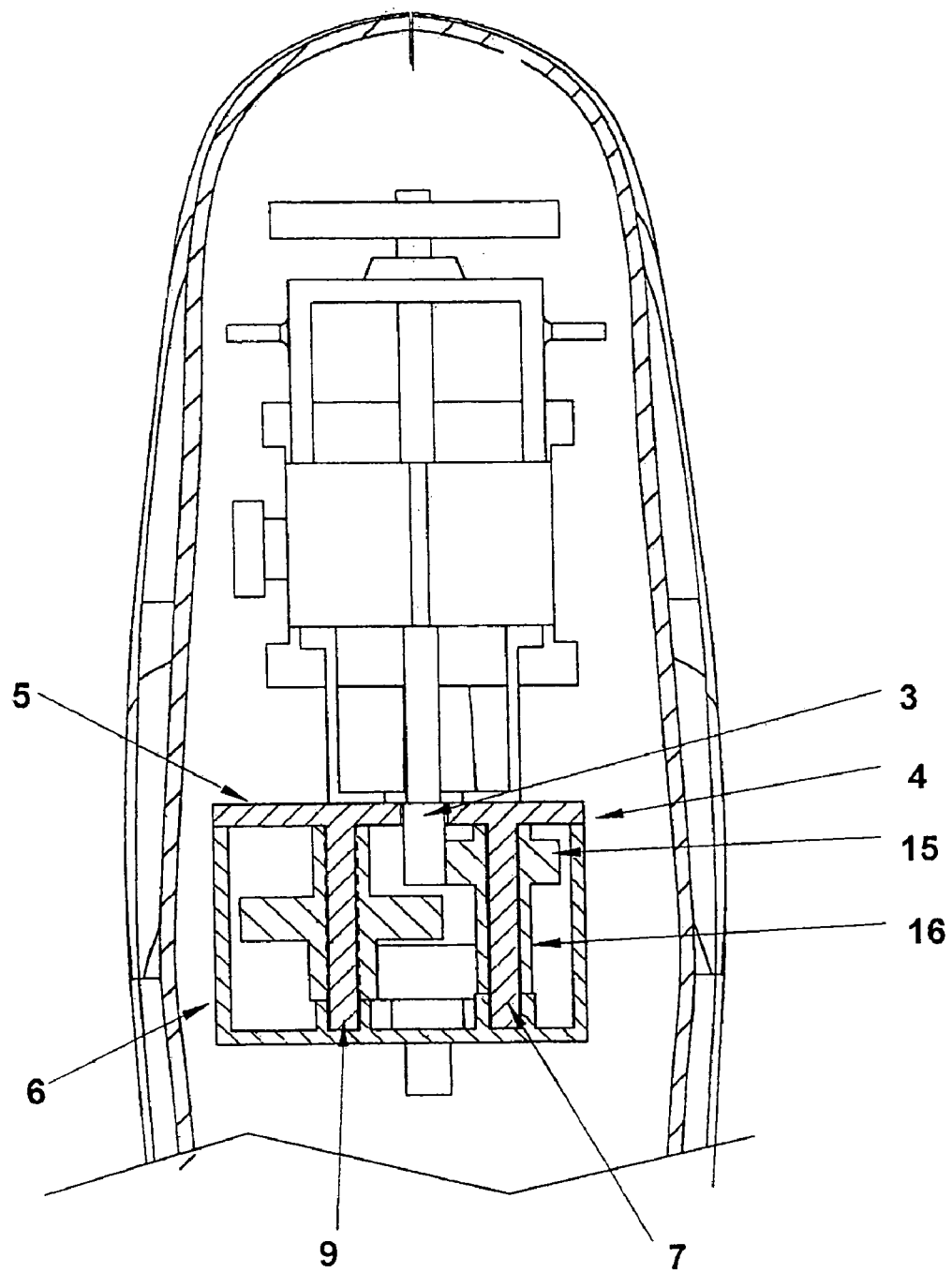
FIG. 3 is a cross section through III—III of the gearbox in FIG. 1.
Figure 4:
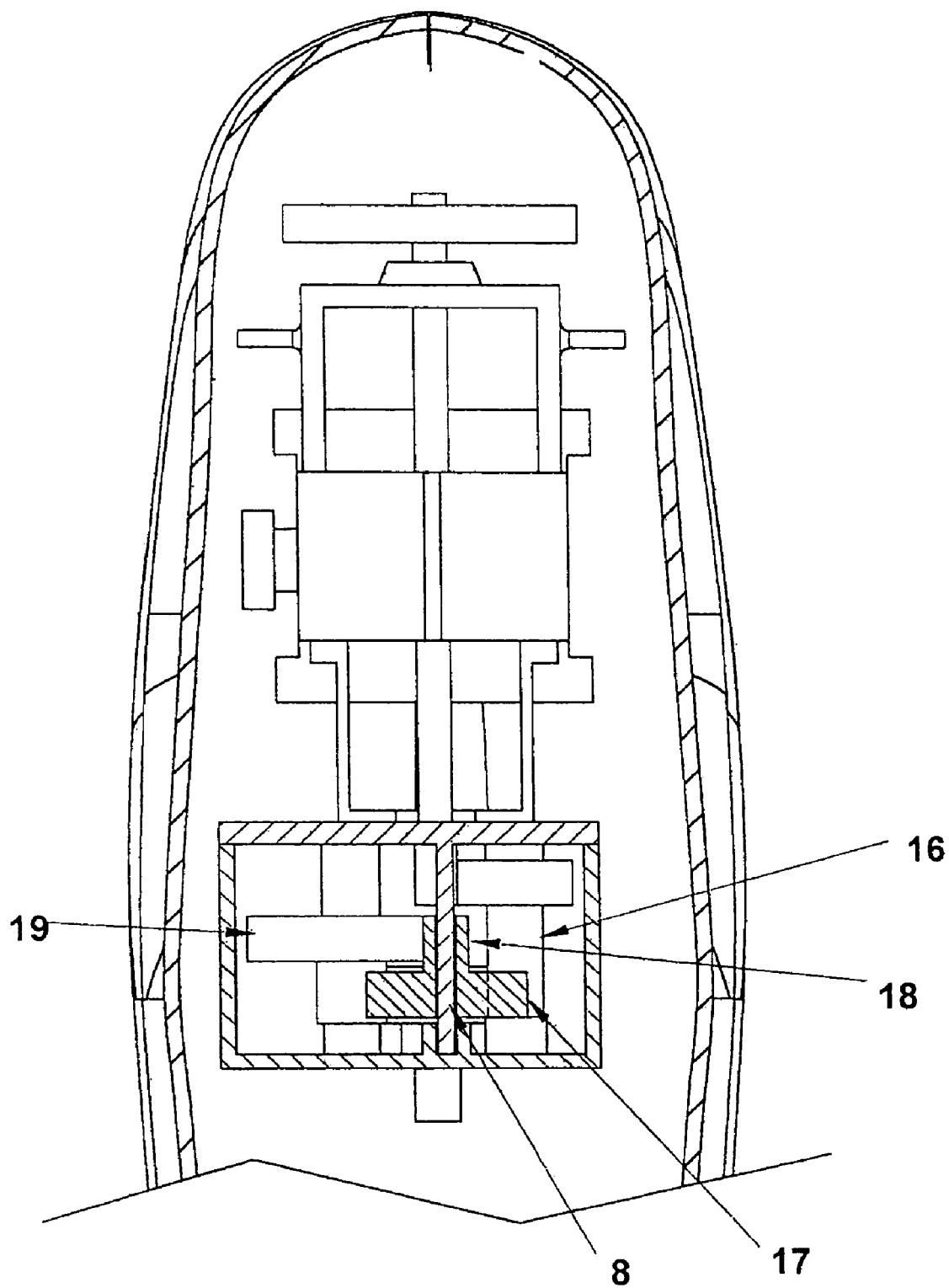
FIG. 4 is a cross section through IV—IV of the gearbox in FIG. 1.
Figure 5:
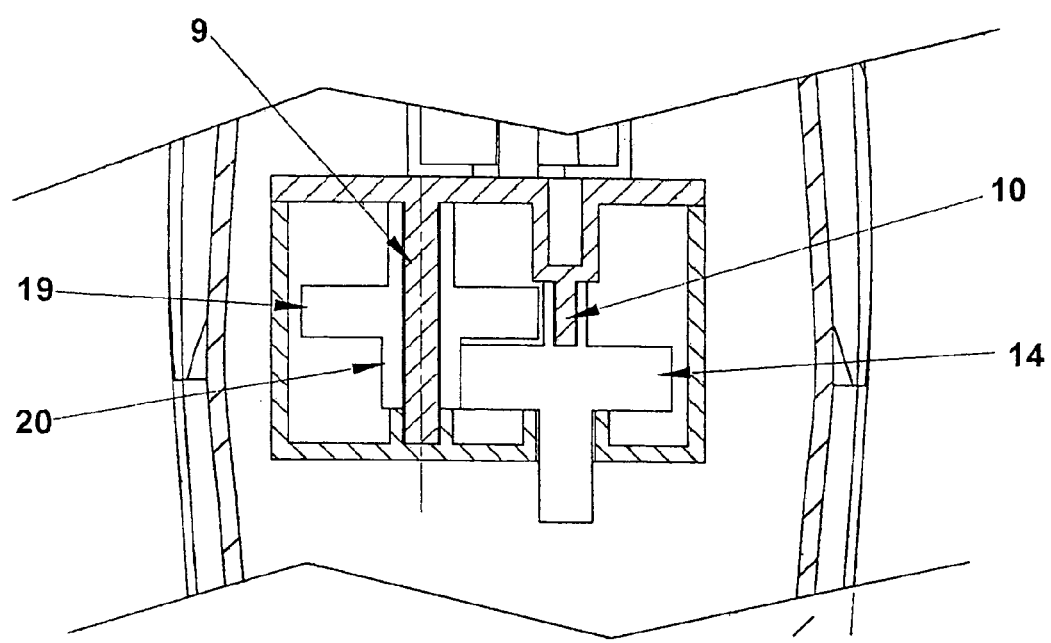
FIG. 5 is a cross section through V—V of the gearbox in FIG. 1.
Figure 6:
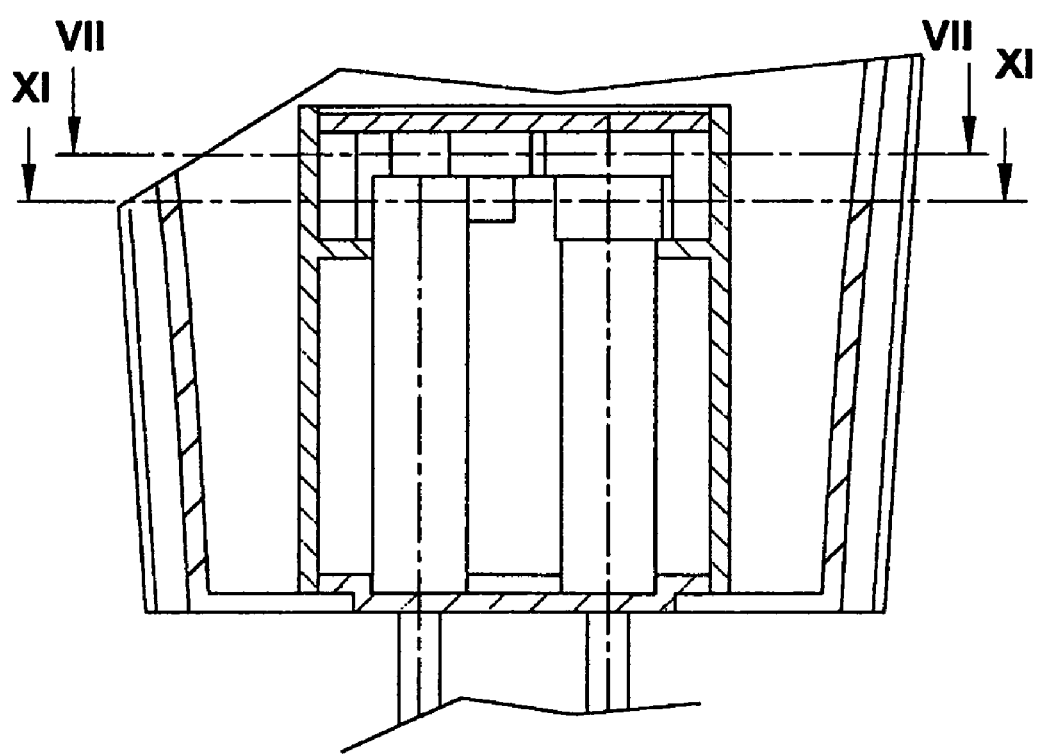
FIG. 6 is a planetary gearbox.
Figure 7:
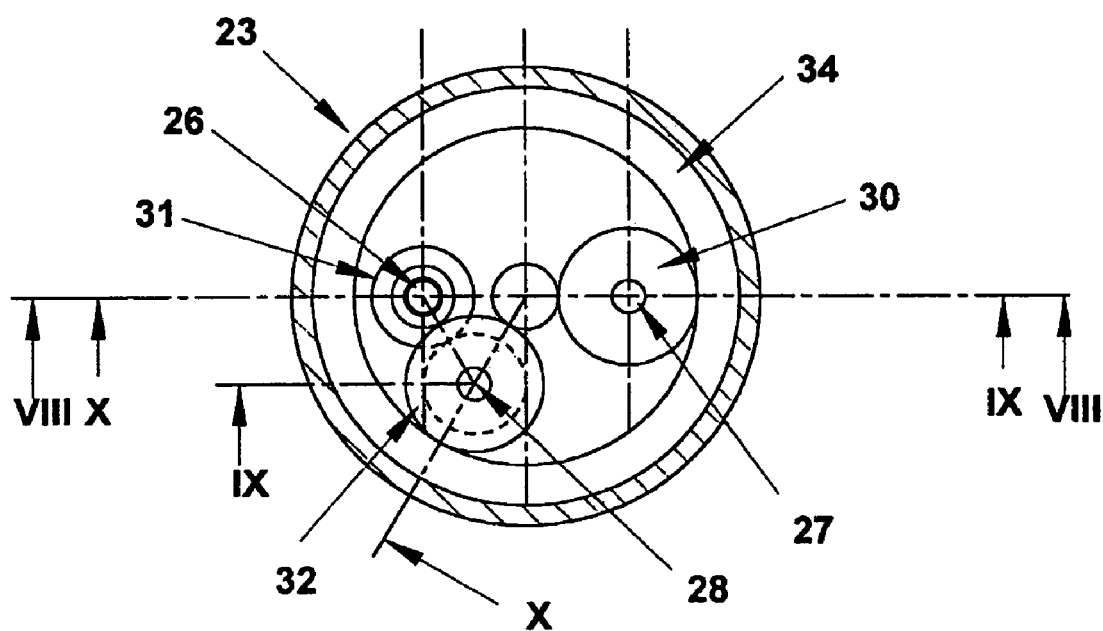
FIG. 7 is a cross section through VII—VII of the gearbox in FIG. 6.
Figure 8:
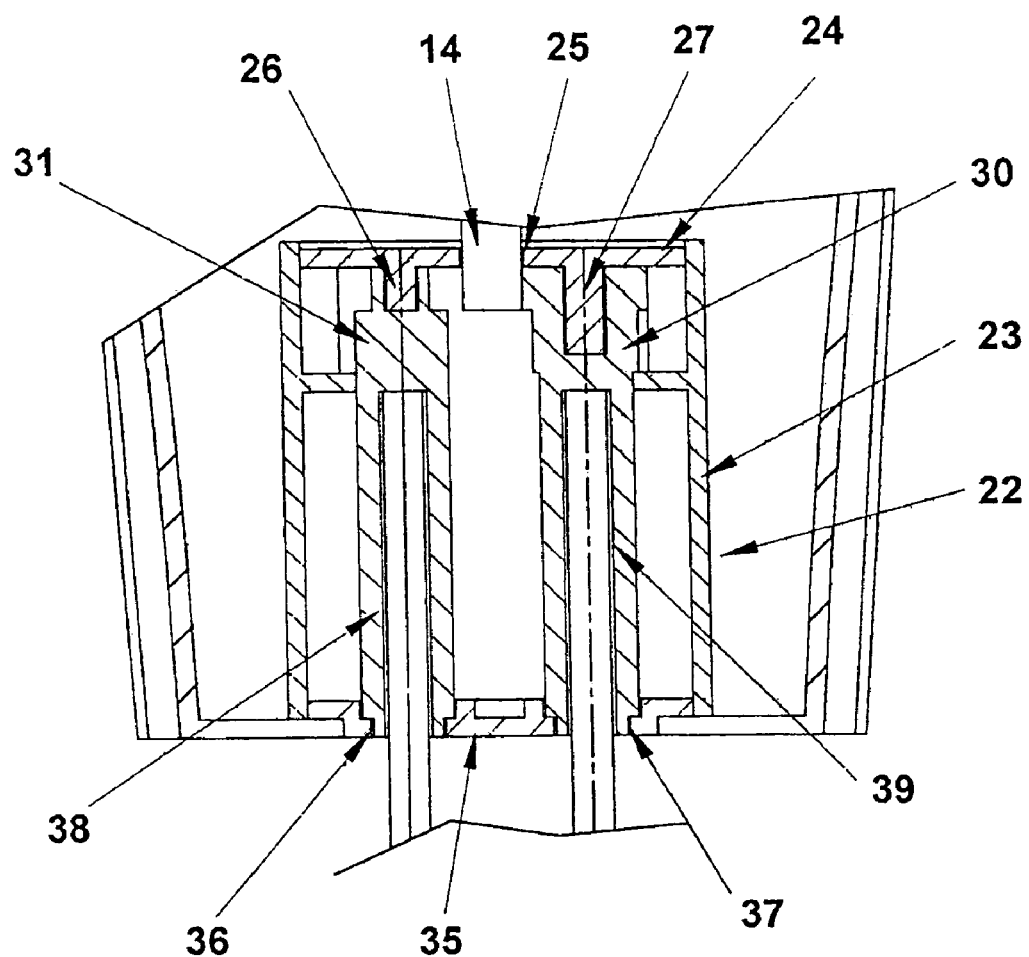
FIG. 8 is a cross section through VIII—VIII of the gearbox in FIG. 7.
Figure 9:
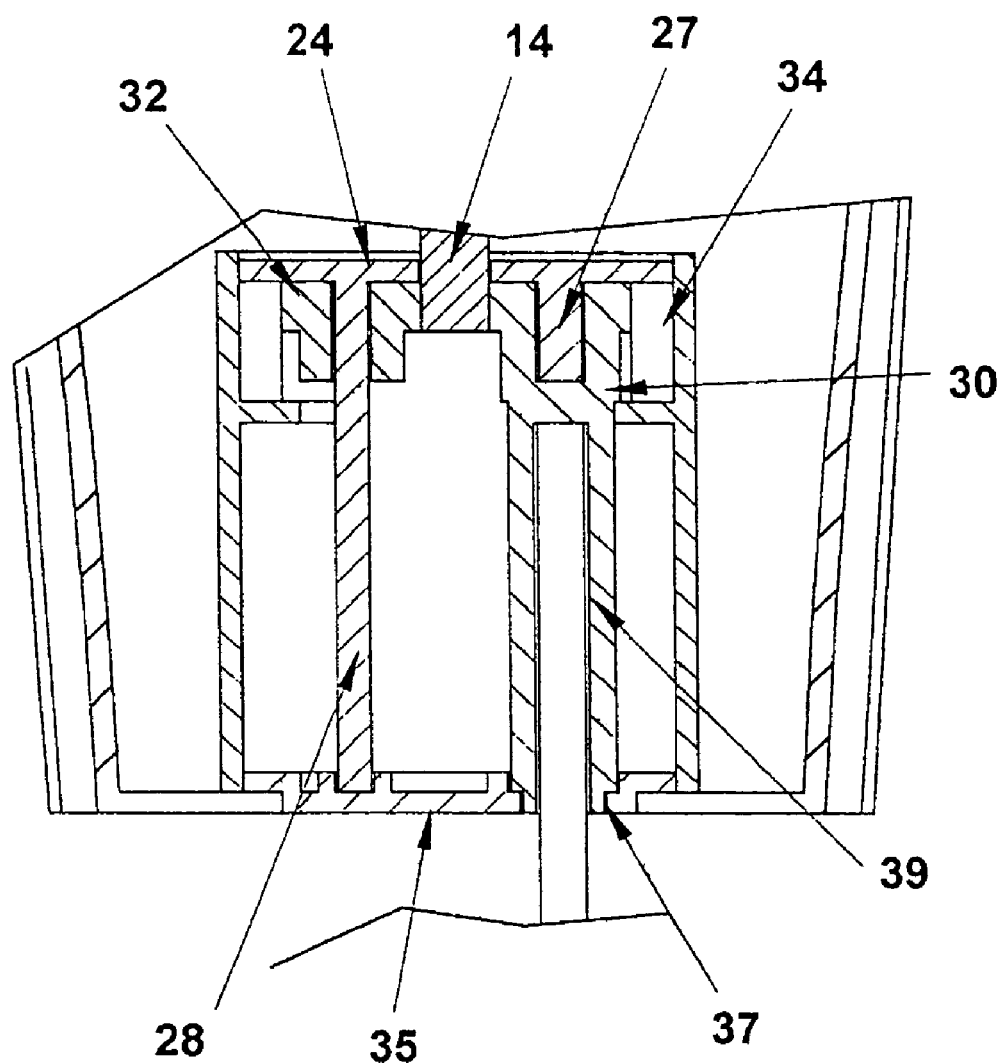
FIG. 9 is a cross section through IX—IX of the gearbox in FIG. 7.
Figure 10:
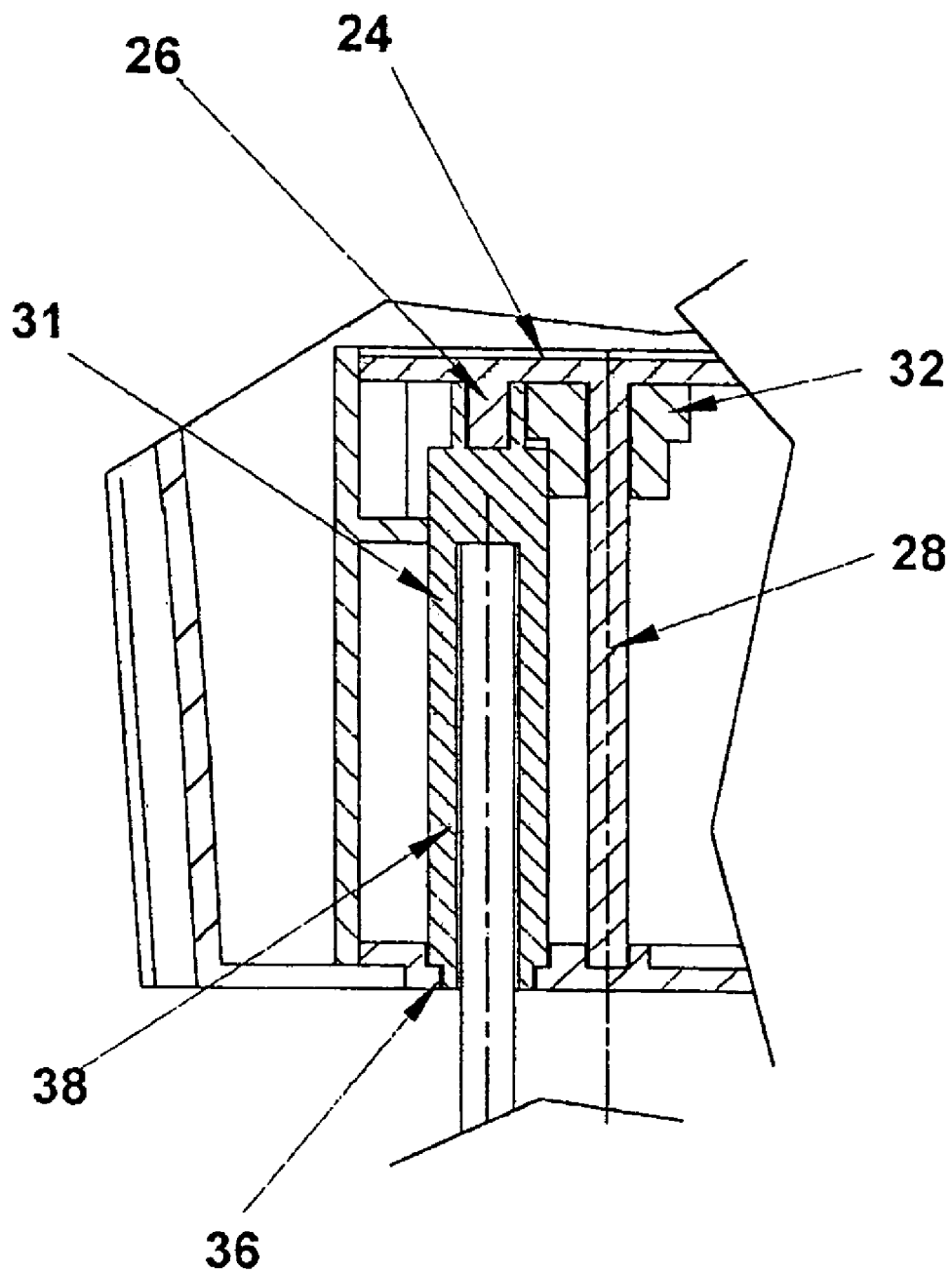
FIG. 10 is a cross section through X—X of the gearbox in FIG. 7.
Figure 11:
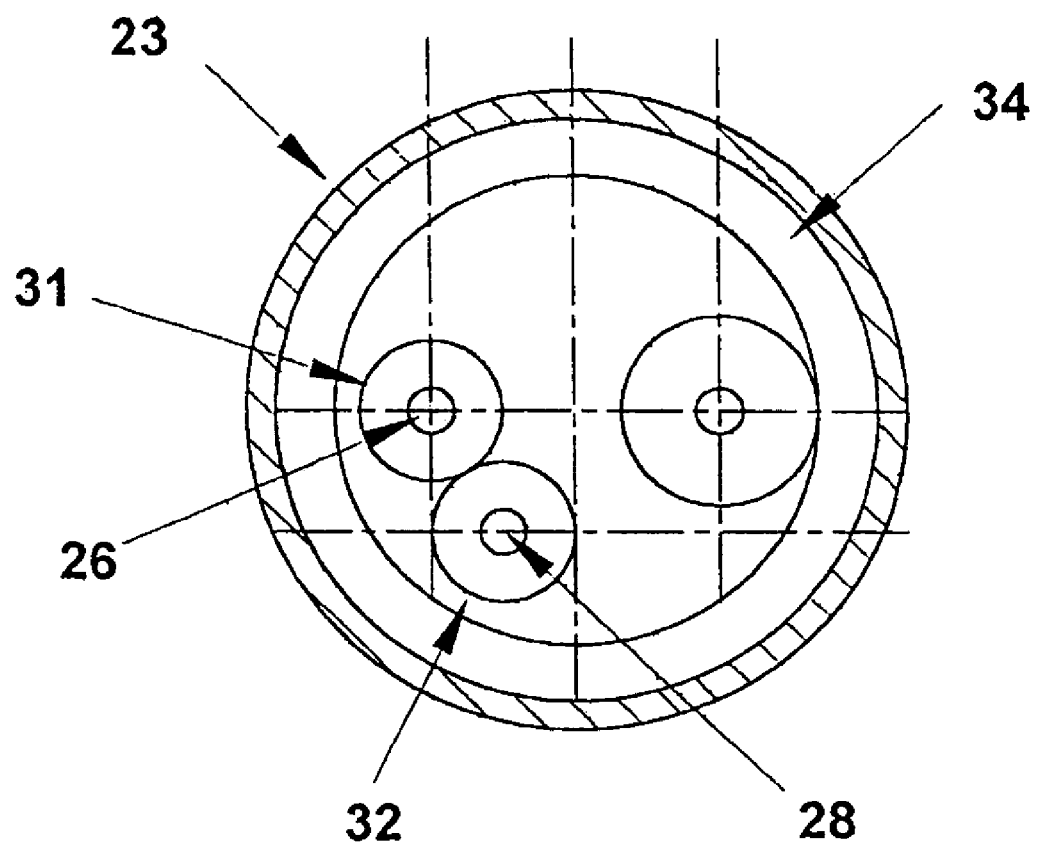
FIG. 11 is a cross section through XI—XI of the gearbox in FIG. 6.

Referring to FIGS. 1 to 5, an electrical hand mixer comprises a housing 1 with a motor 2 mounted with the housing 1. Motor 2 has an axial output shaft on which is mounted a drive gear 3. A reduction gearbox 4 comprises an upper housing member 5 with an aperture in it and lower housing member 6. The upper housing member 5 has shafts 7, 8, 9, and bushing 10 extending downwardly from it. Rotatably mounted on shafts 7, 8, 9, and bushing 10 are compound gears 11, 12, 13 and an output driving gear 14 respectively.

Each compound gear 11, 12, 13 has an upper and a lower toothed periphery of different diameters, The drive gear 3 passes through the aperture in upper housing member 5 and engages with an upper toothed periphery 15 of the first compound gear 11. A lower toothed periphery 16 of first compound gear 11 is engaged with a lower toothed periphery 17 of the second compound gear 12. An upper toothed periphery 18 of second compound gear 12 is engaged with an upper toothed periphery 19 of the third compound gear 13. A lower toothed periphery 20 of third compound gear 13 is engaged with output driving gear 14. The gear chain provides a reduction ratio of 49.8:1 between the output shaft of the motor 2 and the output shaft of the reduction gearbox 4.

Referring to FIG. 6 to 11, a planetary gearbox 22 is positioned with and coupled to the reduction gearbox 4. The planetary gearbox 22 comprises an outer case 23 and a planetary carrier 24. The top of the planetary carrier 24 has a center hole 25 that receives the output driving gear 14 of reduction gearbox 4. The base of the planetary carrier 24 has stub shafts 26, 27 and 28. Rotatably mounted on stub shafts 26, 27, 28 are planetary spindles 31, 30 and reverse gear 32 respectively. A ring gear 34 is positioned at the side of the outer case 23. An inner toothed periphery of the ring gear 34 meshes with the teeth of a planetary spindle 30 and a reverse gear 32. The output-driving gear 14 of gearbox 4 passes through the center hole 25 and drives planetary spindle 30 and compound reverse gear 32. Compound reverse gear 32 drives a second planetary spindle 31 in the opposite direction to the planetary spindle 30. The turning of planetary spindle 30 and reverse compound gear 32 on the ring gear 34 results in rotating movement to planetary carrier 24. Planetary spindle 31 is aligned in parallel with planetary spindle 30. The ends of the planetary spindle 30 and planetary spindle 31 have bores 38 and 39 in which the two beaters are plugged in known manner. A turning base plate 35 is located at the base of the outer case 23. The ends of the planetary spindle 31 and planetary spindle 30 locate in hole 36 and 37 of the turning base plate 35 respectively. The planetary spindles 30, 31 rotate in opposite directions about respective axes while rotating together about a common axis of the planetary carrier 24. The results a more turbulent beating/stirring action.

The above embodiment employs a combination of a reduction gearbox and a planetary gearbox to obtain rotation of the spindles and beaters about respective axles and rotation about a common axis. The reduction gearbox in the above embodiment uses compound gears that make it very bulky and in turn it increases the size of the hand beater.

Figure 12:
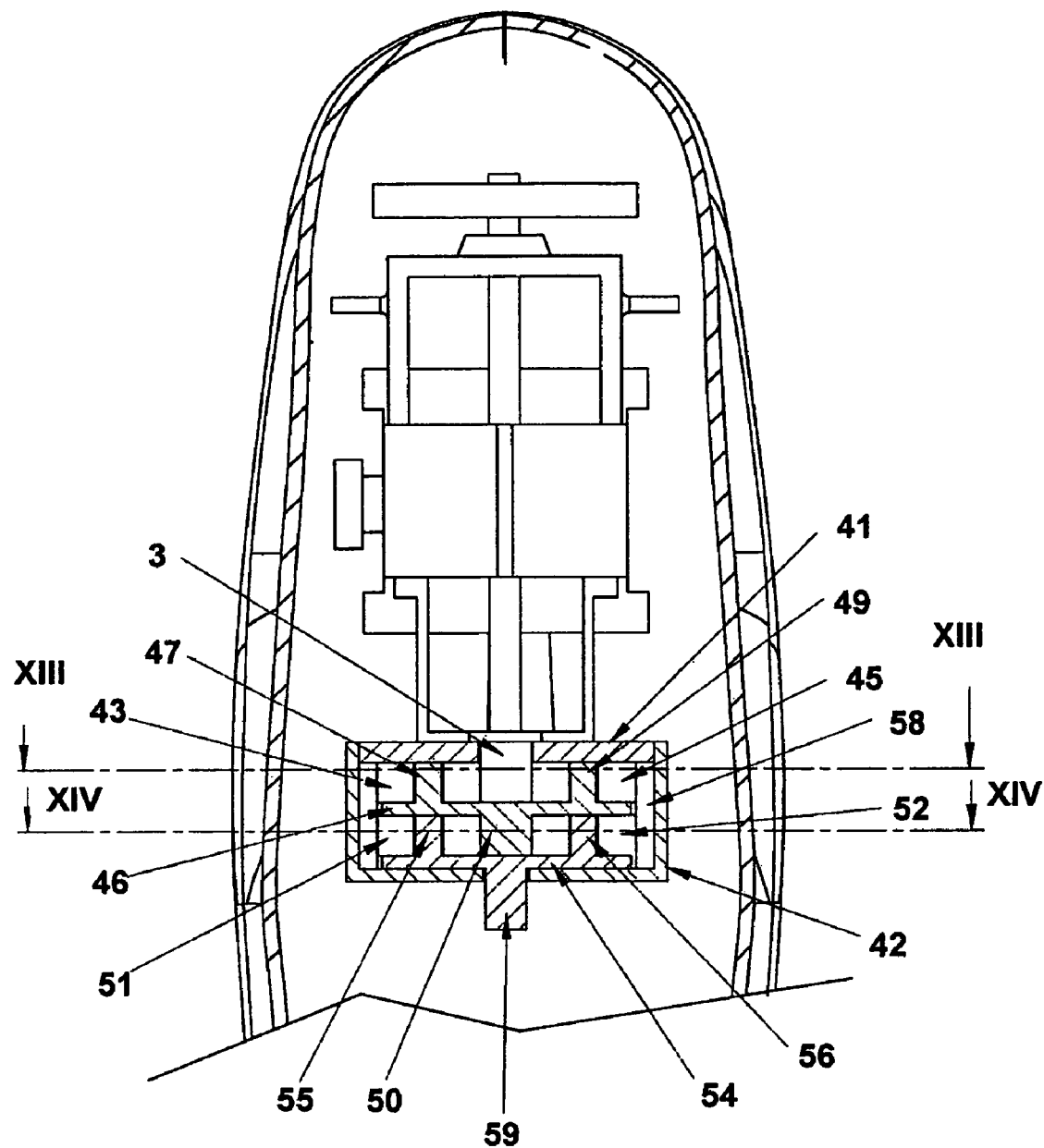
FIG. 12 is a planetary and reduction gearbox.
Figure 13:
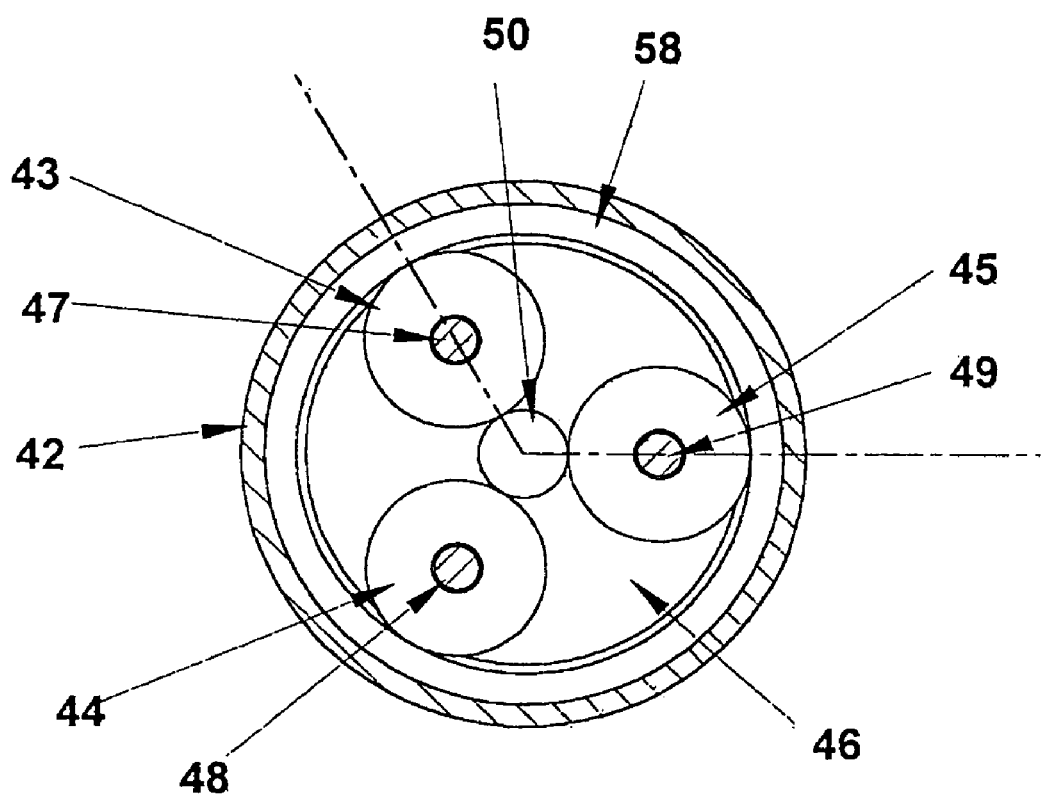
FIG. 13 is a cross section through XIII—XIII of the gearbox in FIG. 12.
Figure 14:
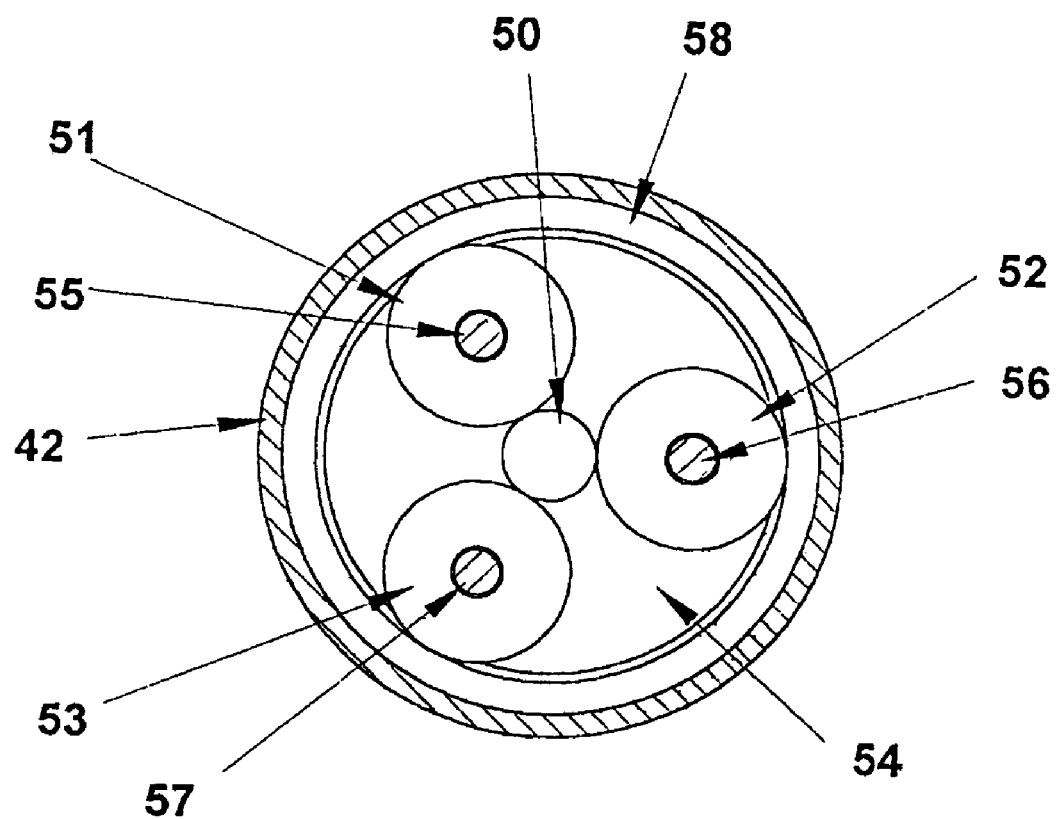
FIG. 14 is a cross section through IX—IX of the gearbox in FIG. 12.

An alternative embodiment of the invention is illustrated by FIGS. 12 to 14 to overcome this problem. A planetary reduction gearbox 40 replaces the reduction compound gearbox 4. The planetary reduction gearbox 40 comprises a housing cover 41 and housing body 42. A ring gear 58 is located on the side of the housing body 42. An upper planetary carrier plate 46 has three shafts 47, 48 and 49. Three upper planetary gears 43, 44 and 45 are rotatably mounted on upper shafts 47, 48 and 49 respectively. A lower planetary carrier plate 54 has three shafts 55, 56 and 57. Three lower planetary gears 51, 52 and 53 are rotatably mounted on lower shafts 55, 56 and 57 respectively.

The driving gear 3 from motor 2 output shaft drives the planetary gears 43, 44 and 45. An inner toothed periphery of the ring gear 58 engages with the outer toothed peripheries of upper planetary gears 43, 44 and 45. The turning of the upper planetary gears 43, 44 and 45 on the ring year 58 causes rotation of the upper planetary carrier plate 46. The base of the upper planetary carrier plate 46 has a center gear 50. Center gear 50 drives lower planetary gears 51, 52 and 53. The inner toothed periphery of the ring gear 58 engages with lower planetary gears 55, 56 and 57. Turning of lower planetary gears 55, 56 and 57 on the ring gear 58 causes rotation of the lower planetary carrier plate 54. The base of the lower planetary carrier plate 54 has an output-driving gear 59. The output-driving gear 59 engages with the planetary gear of a planetary gearbox 22.

Due to the characteristics of the planetary gears, a small size planetary gearbox 40 provides higher gear reduction ratio than that the compound gear box 4. A smaller gearbox is achieved in order to reduce the size of the hand mixer.

Although the dual turning of the heaters causes greater mixing action on the mixture it is not appropriate or suitable for all food preparation jobs. For example, the revolving action of the beaters will have adverse effect in forming globular flour. Thus in a third of embodiment of the invention the planetary gearbox 22 has a stopper to allow the user to de-activate revolving action of the beaters.

Referring to FIGS. 15 to 18, an alternative planetary gearbox 61 comprises a housing 62 enclosing a turning planetary carrier 63 and turning ring gear 70. Turning planetary carrier 63 comprises a center hole 64 and shaft 65, 66 and 67 extending downwardly from its base. The periphery of the planetary carrier 63 has a tab 69. Turning ring gear 70 is position under the planetary carrier 63. The periphery of ring gear 70 also has a tab 71. A first planetary spindle 72, planetary reversing gear 73 and secondary planetary spindle 74 are rotatably mounted shafts 65, 66 and 67 respectively. The ends of planetary spindle 72 and 74 hold the beaters.

The center output driving gear 59 of lower planetary carrier plate 54 of the planetary reduction gearbox 40 extends through center hole 64 and engages with a planetary spindle 72 and planetary reversing gear 73. The planetary reversing gear 73 also engages planetary spindle 74 and drives the planetary spindle 74 in the opposite direction to the planetary spindle 72. A toothed periphery of planetary spindle 72 and planetary reversing gear 73 engages with the toothed periphery of turning ring gear 70. The center output driving gear 59 drives planetary spindle 72 and planetary reversing gear 73. The turning of planetary spindle 72 and planetary reversing gear 73 on turning ring gear 70 must causes either of the planetary carrier 63 or the turning ring gear 70 to rotate. The spindles 72 and 74 are located on the planetary carrier 63 and rotate about a common axis when the planetary carrier 63 rotates.

Figure 15:
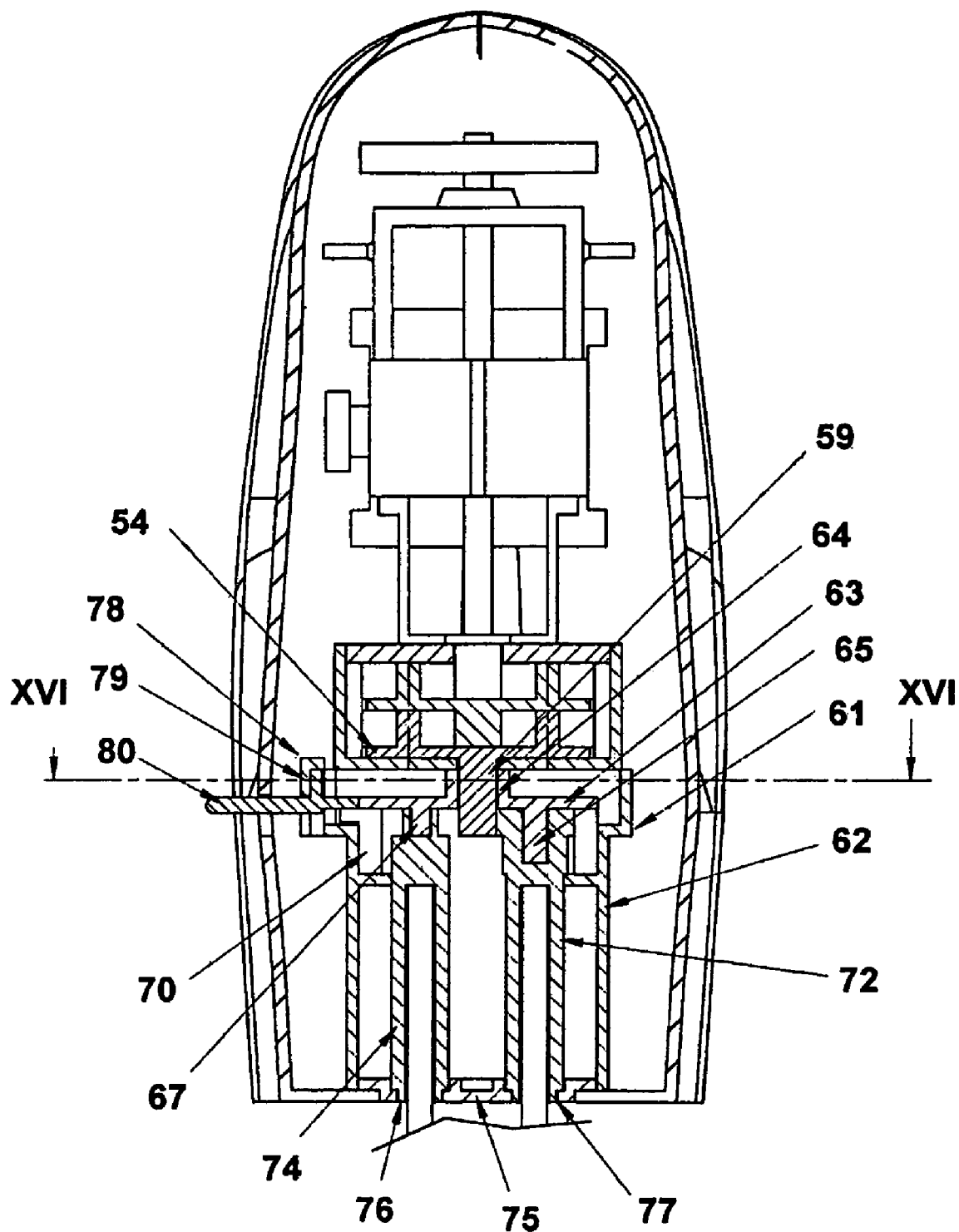
FIG. 15 illustrates an interlock mechanism to stop the revolution of the beaters.
Figure 16:
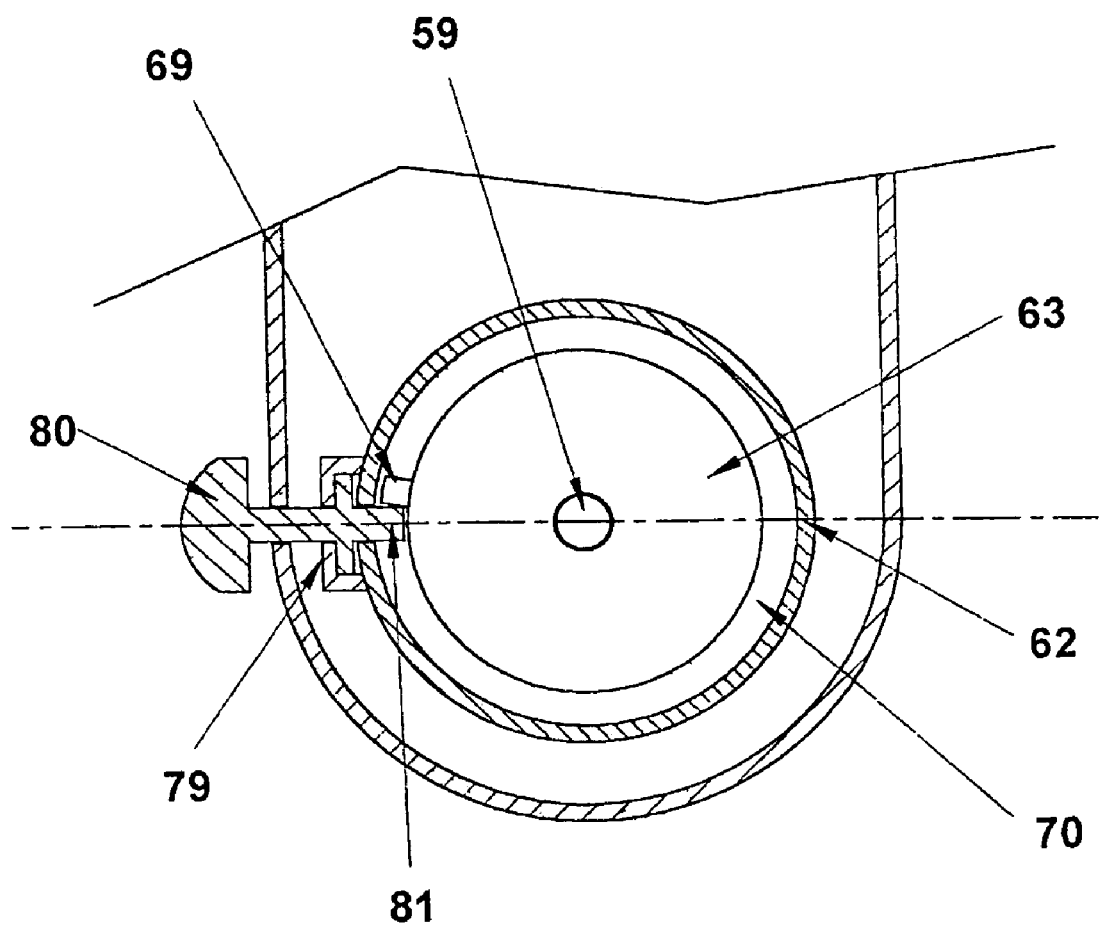
FIG. 16 is a cross section through XVI—XVI of FIG. 15.
Figure 17:
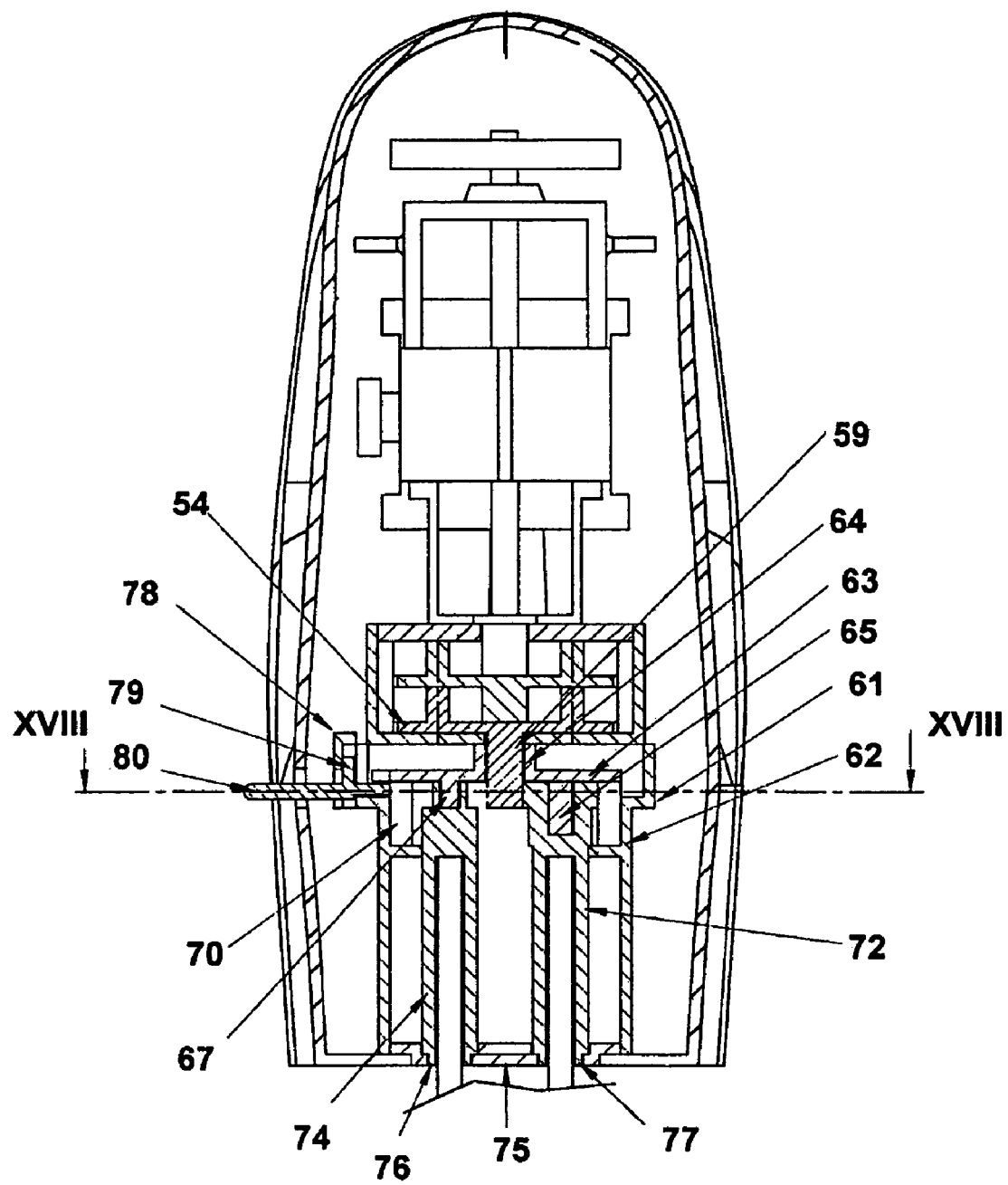
FIG. 17 is a second illustration of the interlock mechanism to stop the revolution of the beaters.
Figure 18:
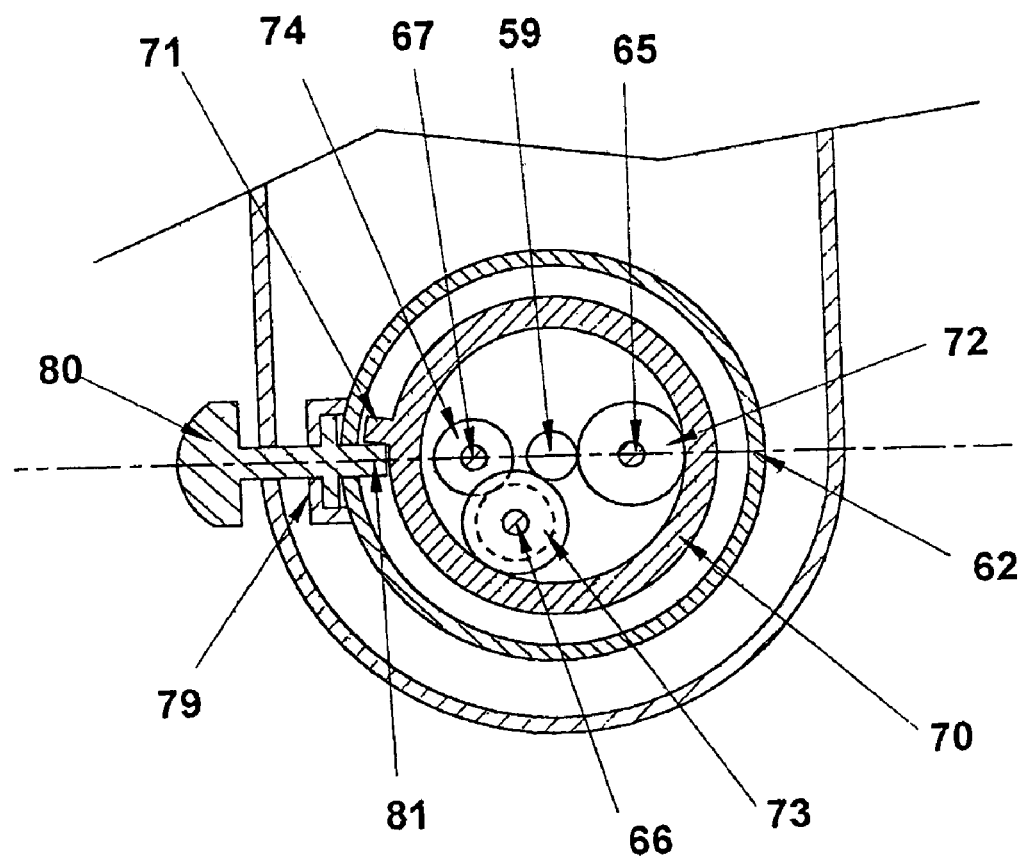
FIG. 18 is a cross section through XVIII—XVIII of FIG. 17.

A turning base plate 75 is located on the bottom of housing 62 with holes 76 and 77, which allow the end of the planetary spindle 74 and 72 to receive beaters. A siding stopper 78 is mounted on the topside of the housing 62 and adjacent to turning planetary carrier 63 and turning ring gear 70. The siding stopper 78 comprises an enclosure 79 and sliding switch 80. The back of sliding switch 80 has a tab 81 that extends adjacent to the periphery of the turning ring gear 70 and turning planetary carrier 63, When the sliding switch 80 is in an upper position (as shown in FIG. 15) the tab 81 will interlock with the stopping tab 69 of the turning planetary carrier 63 and lock it in position. Turning ring gear 70 is free to turn. In this position, the revolving of the beaters will be stopped. When the sliding switch 80 is moved to the downward position (as shown in FIG. 17) the tab 81 will release the turning planetary carrier 63 and interlocks with the stopping tab 71 of turning ring gear 70. It will lock the turning ring gear 70 in position. In this condition, the beaters will be allowed to revolve.

What is claimed is:

1. An electric hand mixer comprising:
   a housing,
   a motor mounted with the housing and having an output shaft,
   a gearbox mounted with the housing and coupled with the output shaft,
   a pair of spindles having respective axes and positioned about a shared axis located between the respective axes, the spindles coupled with the gearbox for rotation about the respective axes and rotation about said shared axis; and
   means for selectively permitting rotation of the spindles about the respective axes and not about said shared axis.

2. The electric hand mixer of claim 1 wherein the gearbox comprises a first reduction portion and a second portion coupled to the spindles for rotation about the respective axes and rotation about said shared axis.

3. The electric hand mixer of claim 1 wherein the gearbox comprises a planetary carrier positioned concentric with the shared axis and having the spindles movably mounted to the planetary carrier, a driving gear coupled with the output shaft and one of the spindles, a ring gear coupled with the driving gear and other one of the spindles, and wherein the ring gear is fixed for rotation of the planetary carrier about the shared axis.

4. The electric hand mixer of claim 1 wherein the gearbox comprises a planetary carrier positioned concentric with the shared axis and having the spindles movably mounted to the planetary carrier, a driving gear coupled with the output shaft and one of the spindles, a ring gear coupled with the driving gear and other one of the spindles, and a stopper movable between a first and a second position for engaging and stopping rotation of either the planetary carrier or ring gear.

* * * * *